Patented Nov. 4, 1930

1,780,636

UNITED STATES PATENT OFFICE

CHARLES M. STINE, OF WILMINGTON, DELAWARE, ASSIGNOR TO E. I. DU PONT DE NEMOURS & COMPANY, OF WILMINGTON, DELAWARE, A CORPORATION OF DELAWARE

SUBSTITUTED GUANIDINE-ALDEHYDE CONDENSATION PRODUCT

No Drawing.   Application filed October 8, 1925.   Serial No. 61,157.

This invention relates to new products, and particularly resinous products, obtainable by condensation of guanidine compounds with aldehydes, especially formaldehyde, and to the process of effecting such condensation. By guanidine compounds, I mean guanidine itself, and its substitution and addition products; and by aldehydes I mean both the aromatic and aliphatic aldehydes.

I have discovered that the guanidines generally react readily with aldehydes, and especially with formaldehyde, to produce valuable condensation products. Some of these products are synthetic resins having properties which render them of great value as plastics and for other purposes for which synthetic resins are ordinarily used. In view of its availability and great reactivity, I shall use formaldehyde as the specific aldehyde with which to condense various guanidines in the following description of my invention, the products ordinarily formed being of a resinous character.

The reaction which occurs initially between guanidine and formaldehyde probably proceeds in accordance with the following equation:

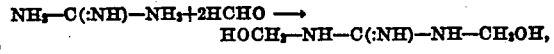

that is, the product of this initial reaction is probably dimethylolguanidine. If three or more moles (molecular proportions) of formaldehyde are used to one mole of guanidine, the product formed initially has possibly the following formula:

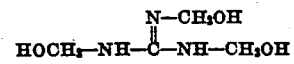

(trimethylolguanidine). If such intermediate compounds are formed, they apparently polymerize rapidly to form complex structures of high molecular weight, the compounds formed being either solid resins, or having a syrupy consistency, at room temperatures.

The guanidines to be used as starting materials in the new process may be divided into the following classes:

1. Guanidine and its salts such as guanidine carbonate,

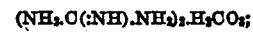

guanidine sulfate; guanidine nitrate; guanidine thiocyanate; etc.

2. Substituted guanidines—that is, substances having the guanidine structure except that one or more of the hydrogen atoms have been replaced by other radicles, either organic or inorganic, but in which one or more hydrogen atoms remain attached to nitrogen atoms of the guanidine nucleus. Examples of the substituted guanidines are: methylguanidine, diphenylguanidine, methylphenylguanidine, nitroguanidine, cyanoguanidine, acetylguanidine, etc.

2(A). Salts of any of the substitution products covered by Class 2 above, examples thereof being methylguanidine nitrate, phenylguanidine sulfate, etc.

The aldehyde used for the reaction may be, for example, formaldehyde, acetaldehyde, propionaldehyde, butyraldehyde, benzaldehyde, salicylaldehyde, etc.

In place of formaldehyde there may be used its polymers such as trioxymethylene and paraformaldehyde, or substances which when added to the reaction mixture would yield formaldehyde by hydrolysis or otherwise, such, for example, as hexamethylenetetramine. Both formaldehyde and products which readily yield formaldehyde may be referred to generically as substances containing a reactive methylene group.

Although the reaction between guanidine salts and formaldehyde takes place, in some cases quite readily, in the absence of condensing agents, the reaction will in many cases be accelerated, and its direction changed, by using condensing agents. These condensing agents may be either acid, alkaline, or neutral, depending upon the character of the particular guanidine to be condensed. For example, the reaction between formaldehyde and guanidine carbonate takes place readily in the absence of added condensing agents. The solution in this case is alkaline in reaction, due to the basic nature of guanidine carbonate in solution. Likewise, the reaction between formaldehyde and guanidine sulfate takes place in the absence of added condensing agents, although the solution in this instance is acid in reaction, due to the guanidine sulfate. If the formaldehyde-guanidine sulfate reaction mixture is maintained in an alkaline condition by the addition of sodium carbonate, the condensation takes place more readily.

The properties of the final product of the condensation will of course depend not only upon the particular guanidine and the particular condensing agent, if any, that are used, but also upon the relative proportions of reagents, and the duration of the heating, the reaction being carried on preferably at an elevated temperature.

The initial, clearly discernible product of the reaction between formaldehyde and a guanidine compound is a solution, or a water-soluble gel. When these initial solutions or gels are heated in a vacuum oven, they are converted into viscous syrups or resins. When the resins are further heated at higher temperatures, they are converted, in many cases, into hard, transparent infusible resins.

The new process may be illustrated in greater detail by the following examples, although it will be understood that my invention is not limited to the specific conditions of operation therein recited.

Example I 15 parts of guanidine carbonate were dissolved in 40 parts of 40% formalin. The solution was boiled under a reflux condenser for about 20 minutes. In order to allow the foaming to subside, the source of heat was removed and the solution soon set to a transparent gel. The gel was placed in a vacuum oven at 50° C. and after 24 hours was obtained as a transparent resin. The product was rendered hard and infusible by further heating at a temperature of about 100° C.

Example II 30 grams of guanidine thiocyanate were dissolved in 100 grams of 40% formalin. The solution was boiled under a reflux condenser for 1.5 hours and then placed in a vacuum oven at 50° C. After 12 hours a viscous syrup was obtained. Further heating converted the syrup into a transparent resin.

Example III 40 grams of guanidine sulfate is dissolved in 100 grams of 40% formalin (i. e. 40% aqueous formaldehyde solution), and the resulting solution heat treated as described in Example II supra. The product obtained was a viscous transparent syrup. When sufficient sodium carbonate was added to the solution of guanidine sulfate in formalin to render the liquid distinctly alkaline at the start, for example, .6 mole of sodium carbonate to one mole of guanidine sulfate, the product obtained upon evaporation was a resin instead of a syrup.

Example IV

A mixture of 5 grams of diphenylguanidine and 25 grams of 40% formalin was heated to boiling. 25 cc. of alcohol was added to bring the diphenylguanidine into solution. The solution was boiled under a reflux condenser for 1.5 hours and was then placed in a vacuum oven at 50° C. for several days. A very thick, sticky syrup was obtained by this procedure.

Methylguanidine nitrate, when substituted for the guanidine thiocyanate in Example II, gave a transparent viscous syrup. The condensation product of dicyandiamide (cyanoguanidine) and formaldehyde is a yellow transparent resin.

As illustrated in the above examples, I prefer to use more than 2, and sometimes in excess of 3, moles of formaldehyde to one mole of guanidine compound. The condensation is accelerated by raising the temperature of the reaction mass; when not using a closed vessel to permit of higher temperatures, I prefer to heat the reaction mass to about 100° C. or to the boiling point of the reaction mixture.

The new products produced in accordance with my invention may be described generically as products obtainable by condensation of aldehydes or their equivalents with guanidine compounds having the following atomic grouping:

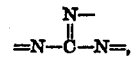

in which one of the nitrogen atoms may be quinquevalent, and in which a nitrogen atom is attached to at least one hydrogen atom. That class of products produced in accordance with my invention and which at this time I consider of most importance, may be defined generically as products obtainable by condensation of a substance containing a reactive methylene group, such as formaldehyde, with guanidine compounds as defined above, and particularly with guanidine compounds having the following atomic grouping—

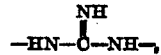

or having the formula

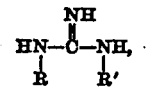

where R stands for hyrogen or an organic radical, and R' stands for hydrogen or an organic radical such as alkyl or aryl.

Although the reaction or condensation between the guanidine compound and formaldehyde is usually carried on in water solution, in view of the fact that formaldehyde is most easily available as a 40% aqueous solution, the reaction or condensation may be carried on in other inert media especially where the guanidine compound is not readily soluble in water. Thus in the case of diphenylguanidine, the condensation was performed in an aqueous-alcoholic solution on account of the low solubility of diphenylguanidine in 40% formalin.

Where a cast or molded article is to be produced, the fusible intermediate condensation product is placed in the mold and heated, or subjected to both heat and pressure. This treatment causes condensation and polymerization of the dimethylolguanidine compound to form a hard infusible material. The characteristics of this final product may be modified by adding to the reaction mass of guanidine compound and aldehyde (formaldehyde) a small amount of a substance, other than a guanidine compound, capable of condensing with said aldehyde to form condensation products, such for example as a phenol, a urea, a substituted urea, or a thiourea. Or instead of adding such a substance to the initial reaction mass, there may be added to the intermediate fusible condensation product before subjecting it to the molding operation various modifiers such, for example, as a vegetable protein, casein, gums or fossil resins, glycerine, etc.; and fillers and pigments such as gypsum, plaster of Paris, china clay, lithopone, barytes, silex, zinc oxide, asbestos, wood flour, etc. For imparting special colors, various dyes, pigments or lakes may be added to the intermediate fusible product. Where a white filler or pigment is used the cast or molded product will resemble porcelain.

After the mass has been molded or cast to form a sufficiently hard and infusible product, it may be subjected to a drying and seasoning. The resulting cast or molded product may then be turned or otherwise machined to produce various articles of commerce.

I claim:

An infusible synthetic resin comprising a polymethylol-substituted-guanidine.

In testimony whereof I affix my signature.

CHARLES M. STINE.